May 19, 1970   E. J. PROULX ET AL   3,512,291
COLLAPSIBLE LANDING NET
Filed Dec. 26, 1968
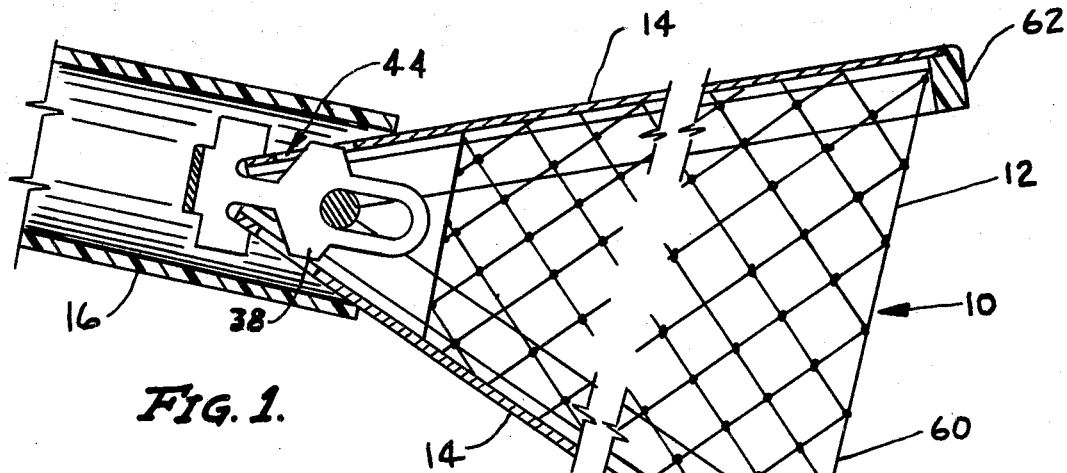
FIG. 1.
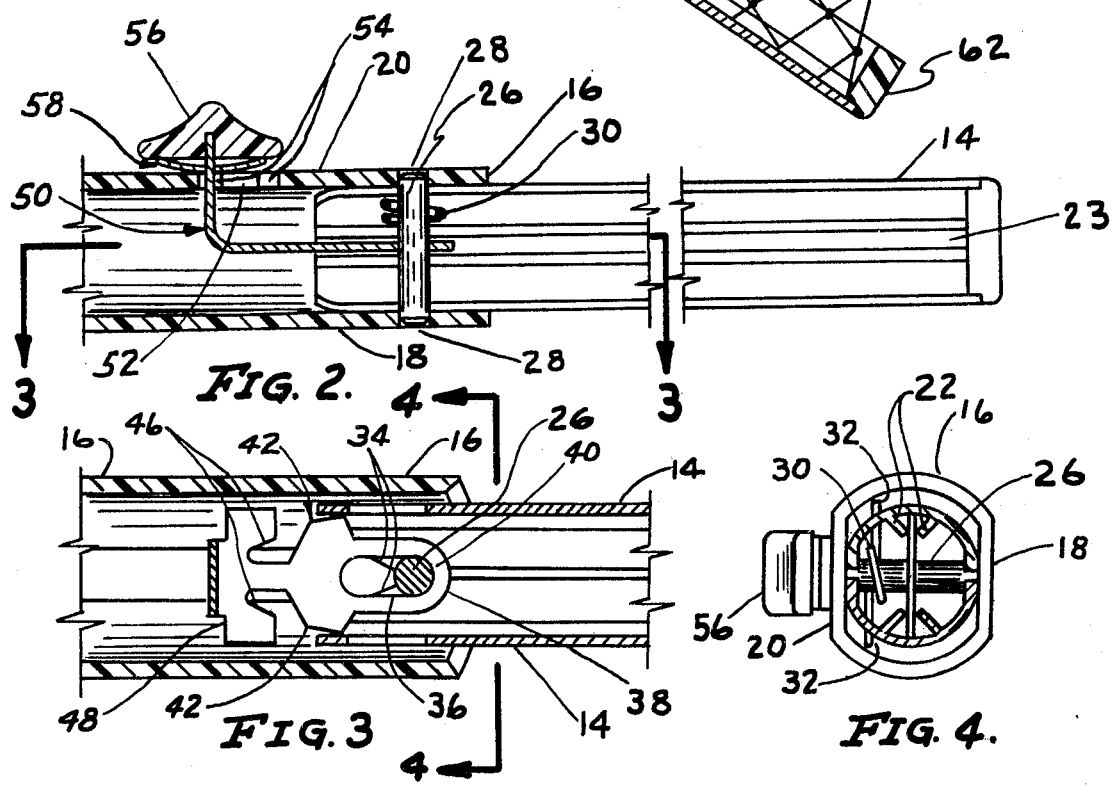
FIG. 2.
FIG. 3.
FIG. 4.
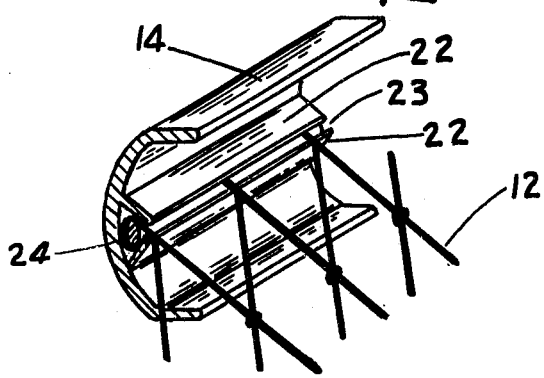
FIG. 5.
INVENTORS
EUGENE J. PROULX.
FREDERICK J. MOORE SR.
GEORGE T. BRENT
BY
*Stefan M. Stein*
Atty.

United States Patent Office 3,512,291
Patented May 19, 1970

3,512,291
COLLAPSIBLE LANDING NET
Eugene J. Proulx, 1651 62nd Ave. S., St. Petersburg, Fla. 33705, Frederick J. Moore, Sr., 1110 4th Ave. NW., Largo, Fla. 33540, and George T. Brent, 10355 Paradise Blvd., Apt. 103, Treasure Island, Fla. 33740
Filed Dec. 26, 1968, Ser. No. 787,026
Int. Cl. A01k 77/00
U.S. Cl. 43—12          9 Claims

ABSTRACT OF THE DISCLOSURE

A self-storing fisherman's landing net. The net is supported on two pivotable extensions of the net's handle and contained between the extensions when they are closed together. A simple latching arrangement springs the extensions apart to expose the net when it is to be utilized.

---

The invention relates to a fisherman's landing net; more particularly, to a fisherman's landing net of the type which may be collapsed and stored when not being utilized.

One of the problems of transferring an open fishing net is that the net tends to be easily snagged on sharp objects such as fishing hooks, tree branches and the like. To overcome this problem, it is known to collapse the net when not in use and store it within a container such that the net is not exposed. While thus stored, the net can be transported without difficulty.

However, known collapsible landing nets have a number of disadvantages. The manner of storing the net is either difficult requiring an unnecessary amount of time, or unduly complicated increasing the cost of its manufacture. In addition, the components which support the net are unnecessarily heavy, making it uncomfortable to carry the landing net over a sustained period of time. Moreover, previous collapsible landing nets are usually equipped with a latch mechanism which not only readily becomes inoperative because of complexity of the mechanism but also does not enable a fisherman to easily and quickly open the net with one hand while holding a fishing rod with the other. Another disadvantage is that the manner of attaching the net to its support members is a time-consuming task which further increases the landing net's manufacturing cost.

Accordingly, an object of this invention is to provide a novel collapsible fisherman's landing net.

Another object is to provide a collapsible landing net which is lightweight and which has a configuration making it comfortable to carry.

Still another object is to provide a collapsible landing net wherein the net may easily be collapsible and stored without being exposed.

A further object is to provide a collapsible landing net which may be simply and quickly opened from a collapsed position.

A still further object is to provide a collapsible landing net with a latch which is simple to operate and reliable but which is not easily rendered inoperative because of wear and corrosion.

Another object is to provide a collapsible landing net wherein the net itself may be handily attached to its support members.

Another object is to provide a collapsible landing net which is practical and economically feasible to manufacture.

Other objects of the invention will in part be obvious and will in part appear hereinafter.

In accordance with the above objects, the invention comprises a novel landing net of the type normally used in fishing. The net is supported on two extensions of the net's handle. These extensions are pivotally attached and pivot between a collapsed or closed position, and an open position. In the closed position, the extensions are collapsed together with the net contained within a cavity formed between the extensions such that no portion of the net is exposed. In the open position, the extensions form a V-shaped opening with the net hanging between and from them. The extensions are spring biased in the open position and a simply operated latch, which may easily be operated by one hand, releases the extensions or locks them in the open and closed position. When the extensions open, the net falls between them and is immediately ready for use. The net is easily attached to the extensions threading the end loops of the net through rigid rods which are in turn slidably secured to the inside portion of the extensions.

The invention accordingly comprises the features of construction, combination of elements, and arrangement of parts which will be exemplified in the construction hereinafter set forth, and the scope of the invention will be indicated in the claims.

For a full understanding of the nature and objects of the invention, reference should be had to the following detailed description taken in connection with the accompanying drawings in which:

FIG. 1 is a partial top cross-sectional view of the landing net showing the net in an open position.

FIG. 2 is a partial cross-sectional elevation view of the above net about the net's longitudinal axis showing particularly the net's extension and latch therefor.

FIG. 3 is a cross-sectional top view of the latch mechanism of the above net in a collapsed position taken along lines 3—3 of FIG. 2.

FIG. 4 is an end view of the extensions taken along lines 4—4 of FIG. 2.

FIG. 5 is a partial end view of one of the extensions showing the manner in which the net is attached to the extensions.

Similar reference characters refer to similar parts throughout the several views of the drawings.

Referring now to the drawings in detail, the landing net is generally indicated as 10, and includes a net 12 supported on two collapsible extensions 14 of the net's handle 16.

As best seen in FIG. 4, handle 16 is tubular with a flattened bottom 18 and top 20 adjacent its net supporting end. The handle is fabricated of a lightweight material such as aluminum or plastic which combined with the handle's tubular configuration make it lightweight as well as strong.

The extensions 14 are rigid, rod-like members U-shaped in cross-section and also preferably extruded or cast of a lightweight material such as aluminum. Integral with each extension and aligned longitudinally along its concaved surface is a pair of pin-receiving partitions 22. The partitions extend inwardly and toward each other leaving a slot 23 between them and defining a containing means for a net support pin 24 as hereinafter described.

The extensions are pivotally attached to the interior of handle 16 with their concaved surfaces facing each other and their inner ends, which extend into the handle, lying adjacent to the handle's flattened top and bottom surfaces. A pivot pin 26 pivotally secures the extensions to the handle. In doing so, pivot pin 26 extends through suitably formed pin openings 28 in the top and bottom flattened surfaces of the handle and through a pin receiving opening in the extensions formed by semi-circular slots cut into each extension where they abut each other. Coiled about pin 28 is an extension separating spring 30. Free arms 32 of the spring extend through suitable holes formed in the extensions and the spring is coiled such that the spring tension biases the net supporting ends of the extensions in an open position. In this position, the extensions form a V-shaped opening with net 12 disposed between them as best seen in FIG. 1. To enable the extensions to pivot to this position, their inner edges 34 which lie posteriorly of pivot pin 28 are chamfered or diagonally cut away.

Pin 28 also extends through a pin receiving slot 36 formed in a flat rigid metallic latch 38 slidably disposed along the longitudinal axis of the handle and extensions and riding within the slots 23 formed between the extensions' partitions 22. Latch 38 either locks the extensions in an open or closed position or enables the extensions to be so opened or closed. It has a forwardly extending narrow portion 40 which borders slot 36 and has the same general configuration. This forward portion 40 is sufficiently narrow to preclude interference with the extensions when they are in their closed position. Extending outwardly and rearwardly from the narrow portion on each side of the latch is a wing cam 42 which extends through longitudinal extension slots 44 of each extension when the extensions are in their open position. The wing cam 42 has receding rearwardly extending cam faces such that as the latch is moved rearwardly the wing cam easily rides over the posterior ends of extension slots 44 to engage the interior sidewalls of the extensions. When wing cam 42 is in its rearward position and engages the inside side walls of the extensions, it has a sufficient width to force the extensions in juxtaposition as shown in FIG. 3.

Extending inwardly and rearwardly from wing cam 42 is a pair of extension end receiving notches 46 formed in a substantially wide rear portion 48 of latch 38. The extension end receiving notches 46 are suitably formed and positioned to receive the extensions and lock them against relative movement when the latch is moved forwardly and the extensions are in their open position.

Integral with the latches' rearward portion 48 is an upright arm 50 which extends through a handle slot 52 on the top surface 20 of handle 16. On one side and each end of handle slot 52 are notches 54 in which direction the support arm 50 is flexibly biased. Removably attached to the support arm is a button or catch 56 for facilitating the disengagement of arms 50 from notches 54 and for sliding arm 50 and integral latch 38 between an extension close position shown in FIG. 3 and an extension open position as shown in FIG. 1. A spring type washer 58 lies between button 56 and handle 16 to provide friction to retain the button in a desired position.

Net 12 is attached to the extensions by threading the end loops of the net to net support pins 24 which are then respectively placed between partitions 22 of each extension such that the net extends through slots 23 formed between the partitions as best seen in FIG. 5. A heavy cord 60 supports the portion of the net which lies between the V-shaped opening of the extension. After net 12 is placed on pins 24 and the pins are inserted into the extensions, an end plug 62 is placed on the anterior end of each extension. When end plug 62 is in place and the extensions are together with the net contained between them, the net is completely enclosed.

Assuming the net is in a closed position as best seen in FIG. 2, a fisherman may easily open the net with one hand by moving button 56 with his thumb out of engagement with notch 54 and moving the button forwardly. Simultaneously, latch 38 also moves forwardly and cam surfaces 42 slide into extension slots 44. As the cam surfaces enter the slots, the extensions are free to be sprung open by spring 30 to their V-shaped open position shown in FIG. 1. As latch 38 is moved by the button to its most forward or open position, notches 44 engage the posterior ends of the extensions locking the extensions in their open position. As the extensions open, net 12 falls between them and is immediately ready for use in landing a fish.

To close landing net 10 and store net 12 between extensions 14, arm 50 is moved out of engagement with notches 44 and moved rearwardly in slot 52 to a position between the notches. In this position, latch 38 has moved rearwardly a sufficient amount to disengage extensions 14 from locking notches 46, but cam surfaces 42 are still within extension notches 44. The landing net 10 is then rotated 90° and the net is folded into the U-shaped cavity of the lower extension. While the net is being folded, the extensions are moved together until they are in juxtaposition with the net completely contained within them. Catch 56 is then moved to its most rearward position which in turn moves cam surfaces 42 of latch 38 out of engagement with extension slots 44 and into contact with the sidewalls of the extensions. As the cam surfaces come into contact with the extensions, the extensions are locked securely in place with the net contained between them. The landing net may then be easily transported. Although not shown, it is to be understood that the handle may be provided with a carrying means such as a leather loop or resilient extensible lanyard to attach the handle on a fisherman's belt or over his shoulder or any such convenient place where it may easily be carried.

It should now be evident that a novel collapsible fisherman's landing net has been invented, wherein a net may easily be stored wtihout exposure; yet, when it is to be accessible, a fisherman through a simple, quick acting non-corrosive type latching arrangement may easily and quickly open the net with one hand. The net has the further features of being lightweight which, with its general configuration, makes it comfortable to carry and being sturdily constructed which enables it to withstand abuse. The net itself may easily be attached to its support members and this feature, combined with the simplicity of construction, makes the landing net practical and economically feasible to manufacture.

It should be obvious that the structure may be used for other nets as well as landing nets, viz, butterfly nets.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has ben described, what is claimed is:

1. A collapsible landing net comprising a handle for carrying said net, handle extensions pivotally attached to said handle and movable from a closed position where they are in juxtaposition to an open position where they approximate a V-shaped opening, said extensions being shaped and sized to provide between them a cavity for storing said net when said extensions are in said closed position, latching means to pivotally open and close said extensions, and net support means for supporting the net on the extensions.

2. The collapsible net of claim 1 wherein the extensions are U-shaped in cross-section approximating a cylindrical cavity for storing the net when said extensions are in their closed position.

3. The collapsible net of claim 1 wherein the latching means includes a movable cam moving into and out of contact with the interior sidewall of each extension by riding respectively out of and into a slot formed in each extension whereby the extensions are cammed to their closed position when in contact with said cam and free to open when said cam is in said slot.

4. The collapsible net of claim 3 wherein the latching means further includes spring means to bias said extensions in said open position.

5. The collapsible net of claim 4 wherein the latching means further includes extension locking means to lock said extensions in an open position.

6. The collapsible net of claim 5 wherein the latching means further includes catch means to move said cam and locking means into and out of contact with said extensions, said catch means slidable between a forward position and a rearward position and catch retention means to retain said catch in said forward and rearward position.

7. The collapsible net of claim 1 wherein said net support means includes a pair of rods, said net attached to said rods by threading the rod in loops of the net such that the net is contained between the rods, a pair of rod support partitions attached to the interior of each extension for receiving one of said rods whereby the rods are inserted and contained within the partitions with the net extending between said partitions.

8. The collapsible net of claim 7 wherein the extensions are U-shaped approximating a cylindrical cavity for storing the net when said extensions are in said closed position.

9. The collapsible net of claim 8 wherein said handle has a hollow end for receiving a pivotal end of each extension, said extensions pivoted to said handle about an extension pivot pin, a coiled spring carried about said pivot pin and having its free ends in engagement with said extensions biasing them toward said open position, said latching means including a slidable rigid plate having an extension pin slot for receiving said pivot pin, said plate slidably disposed along the longitudinal axis of said extensions between a forward and extension open position and a rearward and extension closed position, said plate formed on opposite sides posteriorly of said pin slot with cam surfaces for respectively moving into and out of contact with the interior wall of each extension by riding respectivey out of and into a slot formed in the side wall of each extension whereby the extensions are locked to their closed position when in contact with said cam and free to open when said cam is in said slot, said plate further including rearwardly of said cam surfaces locking means to lock said extensions in open position comprising a pair of notches formed such that when the plate is in said forward position the notches engage the posterior ends of said extensions locking them against relative movement, and catch means to move said plate between the forward and rearward positions.

References Cited

UNITED STATES PATENTS

| | | | |
|---|---|---|---|
| 1,258,632 | 3/1918 | Harris | 43—12 |
| 2,501,975 | 3/1950 | Van Millingen | 43—12 |
| 2,561,645 | 7/1951 | Bedford et al. | 43—12 |
| 2,834,139 | 5/1958 | Needham | 43—12 |

WARNER H. CAMP, Primary Examiner